US012576862B2

(12) United States Patent
Kim

(10) Patent No.: US 12,576,862 B2
(45) Date of Patent: Mar. 17, 2026

(54) SYSTEM FOR DETECTING A FAULTY ECU ON A VEHICLE NETWORK AND A METHOD THEREOF

(71) Applicants: HYUNDAI MOTOR COMPANY, Seoul (KR); KIA CORPORATION, Seoul (KR)

(72) Inventor: Sun Woo Kim, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 276 days.

(21) Appl. No.: 18/439,400

(22) Filed: Feb. 12, 2024

(65) Prior Publication Data

US 2025/0121835 A1 Apr. 17, 2025

(30) Foreign Application Priority Data

Oct. 11, 2023 (KR) ........................ 10-2023-0135264

(51) Int. Cl.
*B60W 50/02* (2012.01)
*H04L 12/40* (2006.01)
(52) U.S. Cl.
CPC ......... *B60W 50/0205* (2013.01); *H04L 12/40* (2013.01); *B60W 2050/021* (2013.01); *H04L 2012/40215* (2013.01); *H04L 2012/40273* (2013.01)
(58) Field of Classification Search
None
See application file for complete search history.

(56) References Cited

U.S. PATENT DOCUMENTS

| | | | |
|---|---|---|---|
| 8,818,628 B2 | 8/2014 | Son | |
| 10,501,081 B2 | 12/2019 | Utagawa | |
| 11,418,363 B2 | 8/2022 | Kim | |
| 2003/0106304 A1* | 6/2003 | Miyahara | F02D 41/222 |
| | | | 60/277 |
| 2014/0081518 A1 | 3/2014 | Son | |
| 2017/0153282 A1* | 6/2017 | Du | G01R 31/52 |
| 2018/0057008 A1 | 3/2018 | Utagawa | |
| 2018/0278616 A1* | 9/2018 | Sakamoto | H04L 63/10 |
| 2018/0370459 A1* | 12/2018 | Kwak | B60R 16/0234 |
| 2019/0028500 A1* | 1/2019 | Lee | H04L 12/40032 |
| 2019/0123908 A1* | 4/2019 | Morita | H04L 9/3242 |
| 2019/0340116 A1* | 11/2019 | Miyauchi | G06F 11/203 |

(Continued)

FOREIGN PATENT DOCUMENTS

| | | | | |
|---|---|---|---|---|
| CN | 102294994 A | * 12/2011 | ............ | B60T 13/746 |
| CN | 105313719 A | 2/2016 | | |

(Continued)

*Primary Examiner* — Shelley Chen
(74) *Attorney, Agent, or Firm* — Lempia Summerfield Katz LLC

(57) ABSTRACT

A system and method for detecting a faulty electronic control unit (ECU) on a vehicle network are disclosed. The system includes a monitoring controller configured to detect an identification (ID) of a controller area network (CAN) message first transmitted on a vehicle network and transmit the ID of the CAN message to a gateway controller. The gateway controller performs a wake-up when a vehicle engine is turned off, enables the monitoring controller and detects an ECU corresponding to the ID of the CAN message as the faulty ECU.

18 Claims, 5 Drawing Sheets

(56)  References Cited

U.S. PATENT DOCUMENTS

| | | | |
|---|---|---|---|
| 2020/0062299 A1 * | 2/2020 | Jeong | B62D 5/0481 |
| 2021/0184890 A1 | 6/2021 | Kim | |
| 2022/0284741 A1 * | 9/2022 | Shiba | G07C 5/0841 |
| 2023/0188518 A1 * | 6/2023 | Jung | H04L 67/12 |
| 2023/0224289 A1 * | 7/2023 | Kiyokawa | H04L 12/12 |
| | | | 726/4 |
| 2023/0367664 A1 * | 11/2023 | Li | B60R 16/023 |

FOREIGN PATENT DOCUMENTS

| | | | | | |
|---|---|---|---|---|---|
| CN | 106105105 | A | * | 11/2016 | H04L 12/6418 |
| CN | 111077873 | A | * | 4/2020 | H04L 63/0245 |
| CN | 111376848 | A | * | 7/2020 | H04L 63/0263 |
| CN | 113051112 | A | * | 6/2021 | G06F 11/2273 |
| CN | 109507981 | B | * | 8/2021 | G05B 23/0213 |
| CN | 114312629 | A | | 4/2022 | |
| CN | 114675620 | A | | 6/2022 | |
| CN | 114024864 | B | * | 2/2023 | H04L 43/04 |
| CN | 116827641 | A | * | 9/2023 | |
| JP | H08237772 | A | * | 9/1996 | |
| JP | 2014169021 | A | * | 9/2014 | |
| JP | 2016172503 | A | | 9/2016 | |
| JP | 6189004 | B1 | * | 8/2017 | G06F 11/3688 |
| JP | 2018059468 | A | * | 4/2018 | F02M 25/0809 |
| KR | 20140036580 | A | | 3/2014 | |
| KR | 20210077542 | A | | 6/2021 | |
| KR | 20210119162 | A | * | 10/2021 | H04L 61/5014 |
| RU | 2726884 | C1 | * | 7/2020 | H04L 63/0869 |
| WO | WO-2012000028 | A1 | * | 1/2012 | F02D 41/0025 |
| WO | WO-2015159520 | A1 | * | 10/2015 | B60R 16/023 |
| WO | WO-2019216306 | A1 | * | 11/2019 | H04L 12/28 |
| WO | WO-2019225257 | A1 | * | 11/2019 | H04L 63/1425 |
| WO | WO-2020105657 | A1 | * | 5/2020 | H04L 12/28 |
| WO | WO-2025134848 | A1 | * | 6/2025 | H04L 43/02 |

* cited by examiner

SYSTEM FOR DETECTING A FAULTY ECU ON A VEHICLE NETWORK AND A METHOD THEREOF

CROSS-REFERENCE TO RELATED APPLICATION

This application claims the benefit of priority to Korean Application No. 10-2023-0135264, filed in the Korean Patent Intellectual Property Office on Oct. 11, 2023, the entire contents of which are incorporated herein by reference.

TECHNICAL FIELD

The present disclosure relates to a technology for detecting a faulty electronics control unit (ECU) among a plurality of ECUs connected to a vehicle network when a vehicle engine is turned off.

BACKGROUND

As electronification of vehicle parts progresses rapidly, the types and number of electronic devices installed on vehicles are greatly increasing. The electronic devices may be largely used in power train control systems, body control systems, chassis control systems, vehicle networks, multimedia systems, and the like.

In this case, the powertrain control system may include an engine control system, an automatic transmission control system, and the like. The body control system may include a body electronic parts control system, a convenience device control system, a lamp control system, and the like. The chassis control system may include a steering control system, a brake control system, a suspension control system, and the like. The vehicle network may include a controller area network (CAN), a FlexRay-based network, a media oriented system transport (MOST)-based network, and the like. The multimedia system may include a navigation system, a telematics system, an infotainment system, and the like.

These systems and the electronic devices that compose each of the systems are connected through the vehicle network. The vehicle network is required to support the functions of each of the electronic devices. The CAN may support transmission rates of up to 1 Mbps, automatic retransmission of collided frames, cycle redundancy check (CRC)-based error detection, and the like. The FlexRay-based network may support transmission speeds of up to 10 Mbps and may support simultaneous data transmission through two channels and synchronous data transmission. The MOST-based network is a communication network for high-quality multimedia and may support transmission speeds of up to 150 Mbps.

Vehicle telematics systems, infotainment systems, and improved safety systems require high transmission speeds and system scalability, but the CAN and the FlexRay-based networks do not sufficiently support such requirements. The MOST-based network may support higher transmission rates than the CAN and FlexRay-based networks, but it comes at a substantial cost to apply MOST-based networks to all networks in a vehicle. Due to these problems, an Ethernet-based network may be considered as a vehicle network. The Ethernet-based network may support bidirectional communication through a pair of windings and may support transmission speeds of up to 10 Gbps.

Generally, in a vehicle network environment where a plurality of Electronic Control Units (ECUs) provided in a vehicle are managed for each domain, a vehicle gateway may perform message transfer (routing) between each domain. The vehicle gateway is equipped with a routing data base (DB). When a message is received from a first ECU (e.g., ECU 1) included in an A domain, the vehicle gateway may search for the routing DB to check whether an identification (ID) of the message exists and whether a destination of the message exists. The vehicle gateway may route the message to a recipient of the message (e.g., an ECU 4 included in a B domain).

In this vehicle network environment, a 'wake-up' of one ECU included in an arbitrary domain causes the vehicle gateway to 'wake-up.' The 'wake-up' of the vehicle gateway ultimately leads to the 'wake-up' of all of the ECUs in the vehicle. Accordingly, when unintentional 'wake-up' occurs excessively due to an error in a specific ECU, unnecessary 'wake-up' of the entire vehicle electronic system occurs, which may cause discharge of the vehicle battery due to dark current.

Matters described in the Background section are provided to enhance understanding of the background of the disclosure. Therefore, the Background section may include subject matter that is not prior art already known to those having ordinary skill in the art to which this disclosure belongs.

SUMMARY

The present disclosure has been made to solve the above-mentioned problems occurring in the prior art while advantages achieved by the prior art are maintained intact.

Aspects of the present disclosure provide a system and a method for detecting a faulty electronic control unit (ECU) on a vehicle network. The system and method may quickly and accurately detect an ECU that repeatedly causes a wake-up state in the vehicle. This is achieved by enabling a monitoring controller by a gateway controller that performs a wake-up when a vehicle engine is turned off. The monitoring controller detects an identification (ID) of a controller area network (CAN) message first transmitted on a vehicle network. The monitoring controller transmits the ID of the CAN message to the gateway controller. The gateway controller detects the ECU corresponding to the ID of the CAN message as the faulty ECU of a plurality of ECUs on the vehicle network.

Other aspects of the present disclosure provide a system for detecting a faulty ECU on a vehicle network and a method thereof that may prevent a battery discharge due to dark current. This is achieved by enabling a monitoring controller by a gateway controller that performs a wake-up when a vehicle engine is turned off. The monitoring controller detects an ID of a CAN message first transmitted on a vehicle network. The monitoring controller also transmits the ID of the CAN message to the gateway controller. The gateway controller detects the ECU corresponding to the ID of the CAN message as the faulty ECU of a plurality of ECUs on the vehicle network, and blocks power to the ECU.

Still other aspects of the present disclosure provide a system for detecting a faulty ECU on a vehicle network and a method thereof that may prevent a battery discharge due to a monitoring controller. This is achieved by enabling a monitoring controller by a gateway controller that performs a wake-up when a vehicle engine is turned off. The monitoring controller monitors the vehicle network from a time the monitoring controller is enabled by the gateway controller until a time the gateway controller enters a second sleep state.

The technical problems to be solved by the present disclosure are not limited to the aforementioned problems. Any other technical problems not mentioned herein should be more clearly understood from the following description by those having ordinary skill in the art to which the present disclosure pertains. In addition, it should be understood that the objects and advantages of the disclosure are realized by systems, methods, and combinations described in the appended claims.

According to an aspect of the present disclosure, a detection system of detecting a faulty ECU on a vehicle network includes a monitoring controller that detects an ID of a CAN message first transmitted on a vehicle network. The system also includes a gateway controller that performs a wake-up when a vehicle engine is turned off, enables the monitoring controller, and detects an ECU corresponding to the ID of the CAN message as the faulty ECU of a plurality of ECUs on the vehicle network.

According to an embodiment, the detection system may further include a power controller that supplies power to each ECU of the plurality of ECUs on the vehicle network. The gateway controller may block the power supplied to the faulty ECU in conjunction with the power controller.

According to an embodiment, the gateway controller may accumulatively count a number of the wake-ups and may enable the monitoring controller when the accumulated count number exceeds a preset number.

According to an embodiment, the gateway controller may enable the monitoring controller when an enable command is received.

According to an embodiment, the gateway controller may enable the monitoring controller when a State of Charge (SOC) of a battery obtained through the vehicle network is less than or equal to a threshold.

According to an embodiment, the gateway controller may perform the wake-up from a sleep state based on that any ECU of the plurality of ECUs on the vehicle network performs the wake-up.

According to an embodiment, the monitoring controller may continue monitoring the vehicle network even when the gateway controller is in a sleep state.

According to an embodiment, the monitoring controller may continue monitoring the vehicle network when a signal enabling the monitoring controller remains at a high level at a time when the gateway controller enters a sleep state.

According to an embodiment, the monitoring controller may terminate monitoring the vehicle network when a signal enabling the monitoring controller changes to a low level at a time when the gateway controller enters a sleep state.

According to an aspect of the present disclosure, a method of detecting a faulty ECU on a vehicle network includes performing a wake-up of a gateway controller when a vehicle engine is turned off. The method also includes enabling, by the gateway controller, a monitoring controller, and detecting, by the monitoring controller, an ID of a CAN message first transmitted on a vehicle network. The method also includes detecting an ECU corresponding to the ID of the CAN message as the faulty ECU of a plurality of ECUs on the vehicle network.

According to an embodiment, the method may further include blocking, by the gateway controller, power supplied to the faulty ECU.

According to an embodiment, enabling the monitoring controller may include counting, by the gateway controller, a number of wake-ups accumulatively, and may include enabling, by the gateway controller, the monitoring controller when the accumulated count number exceeds a preset number.

According to an embodiment, enabling the monitoring controller may include enabling, by the gateway controller, the monitoring controller when the gateway controller receives an enable command.

According to an embodiment, enabling the monitoring controller may include enabling, by the gateway controller, the monitoring controller when a SOC of a battery obtained through the vehicle network is less than or equal to a threshold.

According to an embodiment, performing the wake-up of the gateway controller may include performing the wake-up from a sleep state of the gateway controller based on that any ECU of the plurality of ECUs on the vehicle network performs the wake-up.

According to an embodiment, detecting the ID of the CAN message may include continuing, by the monitoring controller, monitoring the vehicle network even when the gateway controller is in a sleep state.

According to an embodiment, detecting the ID of the CAN message may include continuing, by the monitoring controller, monitoring the vehicle network when a signal enabling the monitoring controller remains a high level at a time when the gateway controller enters a sleep state.

According to an embodiment, detecting the ID of the CAN message may include terminating, by the monitoring controller, monitoring the vehicle network when a signal enabling the monitoring controller changes to a low level at a time when the gateway controller enters a sleep state.

BRIEF DESCRIPTION OF THE DRAWINGS

The above and other objects, features, and advantages of the present disclosure should be more apparent from the following detailed description taken in conjunction with the accompanying drawings.

DETAILED DESCRIPTION

Figure 1:
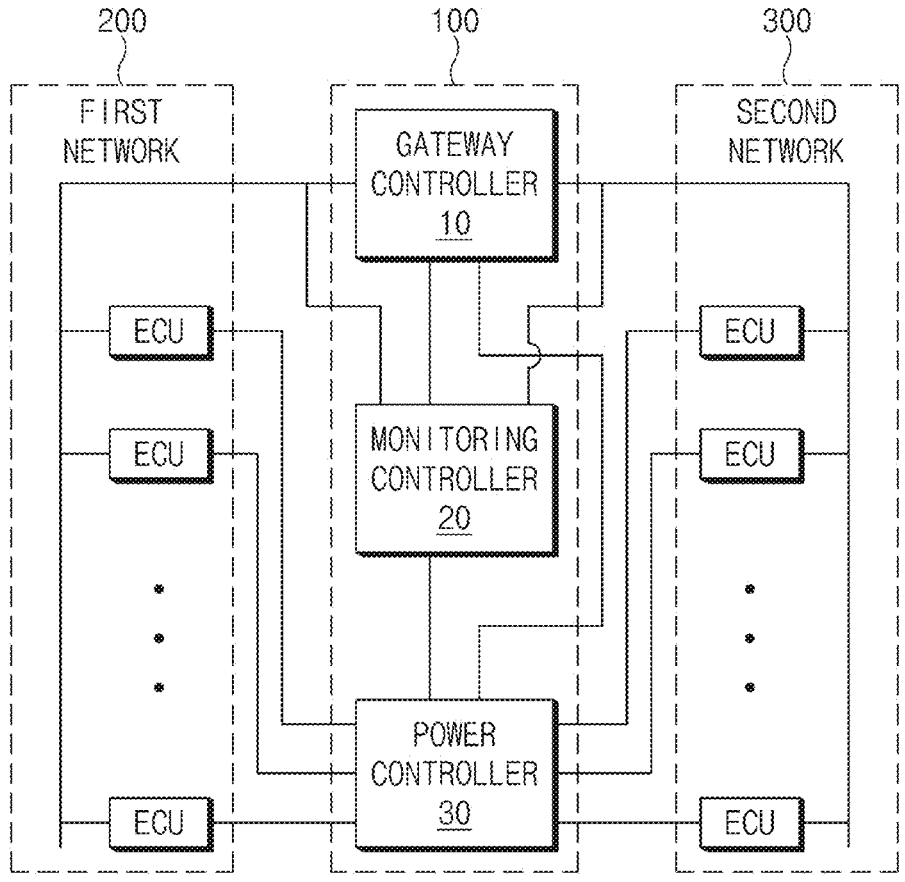
FIG. 1 is a configuration diagram of a system for detecting a faulty ECU on a vehicle network according to an embodiment of the present disclosure.

Hereinafter, embodiments of the present disclosure are described in detail with reference to the accompanying drawings. In adding the reference numerals to the components of each drawing, it should be noted that the identical or equivalent component is designated by the identical numeral even when they are displayed on other drawings. In addition, a detailed description of well-known features or functions has been omitted in order not to unnecessarily obscure the gist of the present disclosure.

In describing elements of embodiments of the present disclosure, the terms first, second, A, B, (a), (b), and the like may be used herein. These terms are merely intended to distinguish the components from other components, and the terms do not limit the nature, order, or sequence of the components. Unless otherwise defined, all terms including technical and scientific terms used herein have the same meaning as commonly understood by one of ordinary skill in the art to which this disclosure belongs. It should be further understood that terms, such as those defined in commonly used dictionaries, should be interpreted as having a meaning that is consistent with their meaning in the context of the relevant art and should not be interpreted in an idealized or overly formal sense unless expressly so defined herein.

According to at least one of the embodiments of the present disclosure, there are effects that may be suitable for large-scale communication processing, may be optimized for high throughput and real-time data processing, and may operate asynchronously. In addition, there are effects that may support bidirectional streams, by communicating with a control server based on a first communication protocol and a second communication protocol. Furthermore, there are effects that may compensate for the shortcomings of the general MQTT protocol and may prevent the robot from receiving incorrect commands by minimizing data loss.

When a controller, component, device, element, part, unit, module, or the like of the present disclosure is described as having a purpose or performing an operation, function, or the like, the controller, component, device, element, part, unit, or module should be considered herein as being "configured to" meet that purpose or perform that operation or function. Each controller, component, device, element, part, unit, module, and the like may separately embody or be included with a processor and a memory, such as a non-transitory computer readable media, as part of the apparatus.

FIG. 1 is a configuration diagram of a system for detecting a faulty electronic control unit (ECU) on a vehicle network according to an embodiment of the present disclosure.

As illustrated in FIG. 1, a faulty ECU detection system 100 on a vehicle network according to an embodiment of the present disclosure may include a gateway controller 10, a monitoring controller 20, and a power controller 30. In this case, based on the method of implementing the faulty ECU detection system 100 on a vehicle network according to an embodiment of the present disclosure, each component may be combined with each other and implemented as one, or some components may be omitted. In addition, each of the controllers 10, 20, and 30 may be implemented in the form of hardware, software, or a combination of hardware and software. The controllers may be implemented as a microprocessor but are not limited thereto.

Looking at each of the above components, first, the gateway controller 10 is a Micro Controller Unit MCU) that performs overall control of the vehicle gateway. The gateway controller 10 may control a data transfer between the ECUs on the vehicle network as well as a data transfer between the ECU on the vehicle network and an external server or diagnostic devices.

For example, when the vehicle network includes a first network 200 and a second network 300, the gateway controller 10 may control the data transfer between the ECUs on the first network 200 and the ECUs on the second network 300. In this case, to aid understanding, the case where a vehicle network includes two networks (e.g., domains or channels) is described as an example, but the number of networks 200 and 300 does not have any effect on the present disclosure.

The gateway controller 10 may perform the 'wake-up' from a sleep state based on the ECUs on the vehicle network being configured to perform a 'wake-up' when the vehicle engine is turned off (i.e., the engine is off in the case of an internal combustion engine vehicle, or the state is not ready for departure in the case of an electric vehicle). In this case, the ECUs may perform the 'wake-up' normally to perform updates, and the like, or may repeatedly perform the 'wake-up' and the 'sleep' due to an error occurrence. In addition, the 'wake-up' refers to an algorithm that automatically activates without user intervention.

The gateway controller 10, which entered the 'wake-up' state from the 'sleep' state, may accumulatively count the number of 'wake-up' times. In this case, the accumulated counting value may be stored in a memory provided in the gateway controller 10. In addition, when the accumulated counting number exceeds a preset number, the gateway controller 10 may determine that an error has occurred in a specific ECU on the vehicle network and repetitive 'wake-up' has occurred and may thus enable the monitoring controller 20.

Additionally, the gateway controller 10 may enable the monitoring controller 20 in response to an enable command received from an external diagnostic device or an external management server. In addition, the gateway controller 10 may enable the monitoring controller 20 when a state of charge (SOC) of a battery obtained through the vehicle network is less than or equal to a threshold (e.g., 40%).

The monitoring controller 20, which is enabled by the gateway controller 10, may monitor both the first network 200 and the second network 300. In this case, the monitoring controller 20 may detect an identification (ID) of the Controller Area Network (CAN) message first transmitted on the first network 200 and the second network 300. Subsequently, the monitoring controller 20 may transmit the ID of the CAN message to the gateway controller 10.

For reference, the 'wake-up' of any ECU on the vehicle network causes a 'wake-up' of the gateway controller 10. The 'wake-up' of the gateway controller 10 ultimately leads to the 'wake-up' of all ECUs in the vehicle. In this case, when each ECU enters the 'wake-up' state, each ECU immediately transmits the CAN message notifying the 'wake-up' state to the vehicle network. In the end, the ECU that performs the 'wake-up' first, transmits the CAN message first.

The gateway controller 10 may receive the ID of the CAN message from the monitoring controller 20 and may detect the ECU corresponding to the ID of the CAN message as the faulty ECU.

Ultimately, the gateway controller 10 is configured to detect the ECU that wakes itself up more than a preset number of times while the vehicle engine is turned off as the faulty ECU. In addition, the gateway controller 10 may block power supplied to the faulty ECU in conjunction with the power controller 30 that supplies power to each ECU. Accordingly, discharge of the battery due to dark current may be prevented.

Figure 2:
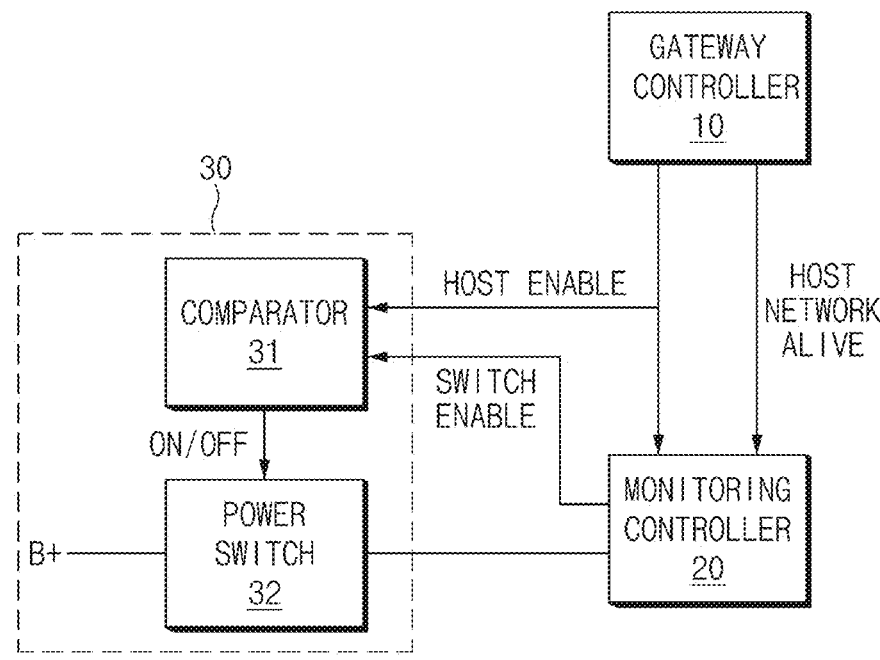
FIG. 2 is a detailed configuration diagram of a system for detecting a faulty ECU on a vehicle network according to an embodiment of the present disclosure.

FIG. 2 is a detailed configuration diagram of a system for detecting a faulty ECU on a vehicle network according to an embodiment of the present disclosure.

As illustrated in FIG. 2, the gateway controller 10, which is changed from the 'sleep' state to the 'wake-up' state, may transmit a first signal informing the enabling (e.g., Host Network Alive) of the vehicle network to the monitoring controller 20 while the vehicle network remains in the enable state.

In addition, when the accumulated counting number of the 'wake-up' exceeds the preset number, the gateway controller 10 may transmit a second signal for enabling (e.g., a host enable) the monitoring controller 20 to the monitoring controller 20. In this case, the second signal may be input to a comparator 31 in the power controller 30.

The monitoring controller 20 enabled by the second signal from the gateway controller 10 may provide a switch enable signal to the comparator 31. The comparator 31 may turn on or off a power switch 32 based on the second signal and the switch enable signal.

Figure 3:
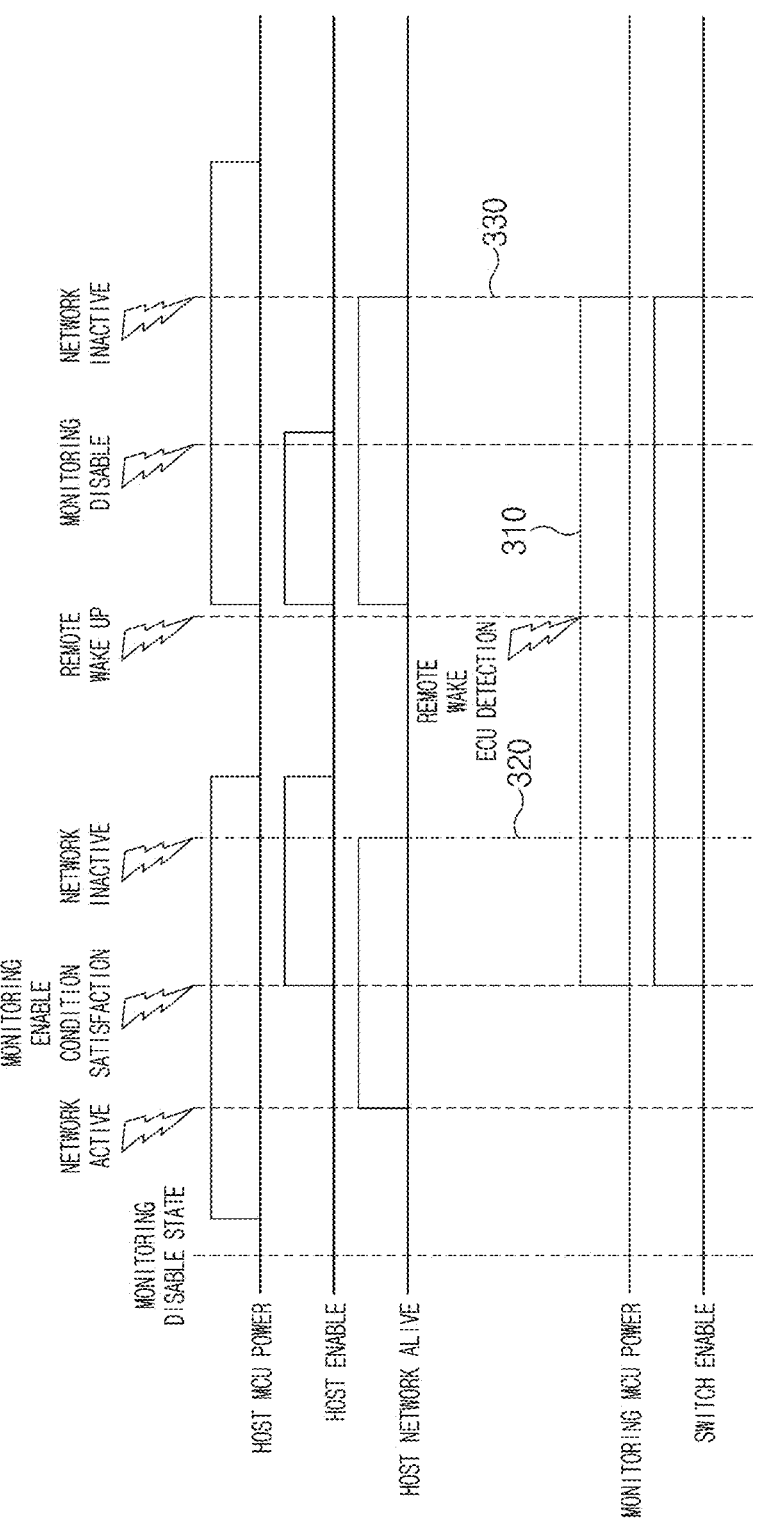
FIG. 3 is an example diagram illustrating a monitoring process of a monitoring controller provided in a system for detecting a faulty ECU on a vehicle network according to an embodiment of the present disclosure.

FIG. 3 is an example diagram illustrating a monitoring process of a monitoring controller provided in a system for detecting a faulty ECU on a vehicle network according to an embodiment of the present disclosure.

In FIG. 3, a reference number '310' represents a section where the monitoring controller 20 monitors the vehicle network. Additionally, a reference number '320' represents a time when the monitoring controller 20 maintains monitoring of the vehicle network, and a reference number '330' represents a time when the monitoring controller 20 ends monitoring with respect to the vehicle network.

As illustrated in FIG. 3, at the falling edge time 320 of a 'Host Network Alive' signal, the 'Host Enable' signal is at a high level. Therefore, the monitoring controller 20 may maintain the 'Switch Enable' signal at the high level. In this case, the falling edge time 320 of the 'Host Network Alive' signal indicates a time when the gateway controller 10 enters the sleep state. Here, "high level" may refer an elevated or upper predetermined or threshold signal level.

Accordingly, the comparator 31 may output an on signal, and the power switch 32 may maintain the on state, allowing the monitoring controller 20 to continuously receive power. In other words, the monitoring controller 20 may continue monitoring the vehicle network even in the sleep state of the gateway controller 10.

At the falling edge time 330 of the 'Host Network Alive' signal, the 'Host Enable' signal is at a lower level. As a result, the monitoring controller 20 may change the 'Switch Enable' signal to a low level. In this case, the falling edge time 330 of the 'Host Network Alive' signal indicates the time when the gateway controller 10 enters the sleep state. Here, "low level" may refer a reduced or lower predetermined or threshold signal level.

Accordingly, the comparator 31 may output an off signal, and the power switch 32 is changed to the off state, cutting off the power supplied to the monitoring controller 20. In other words, the monitoring controller 20 may end monitoring the vehicle network when the gateway controller 10 is in the sleep state.

As above, in an embodiment of the present disclosure, the reason why the gateway controller 10 and the monitoring controller 20 are implemented as separate configurations is that the monitoring controller 20 has a lower power consumption compared to the gateway controller 10. Additionally, this allows the monitoring controller 20 to monitor the vehicle network even when the gateway controller 10 is in the sleep state. However, based on the designer's intention, the gateway controller 10 may be implemented to perform the functions of the monitoring controller 20.

Figure 4:
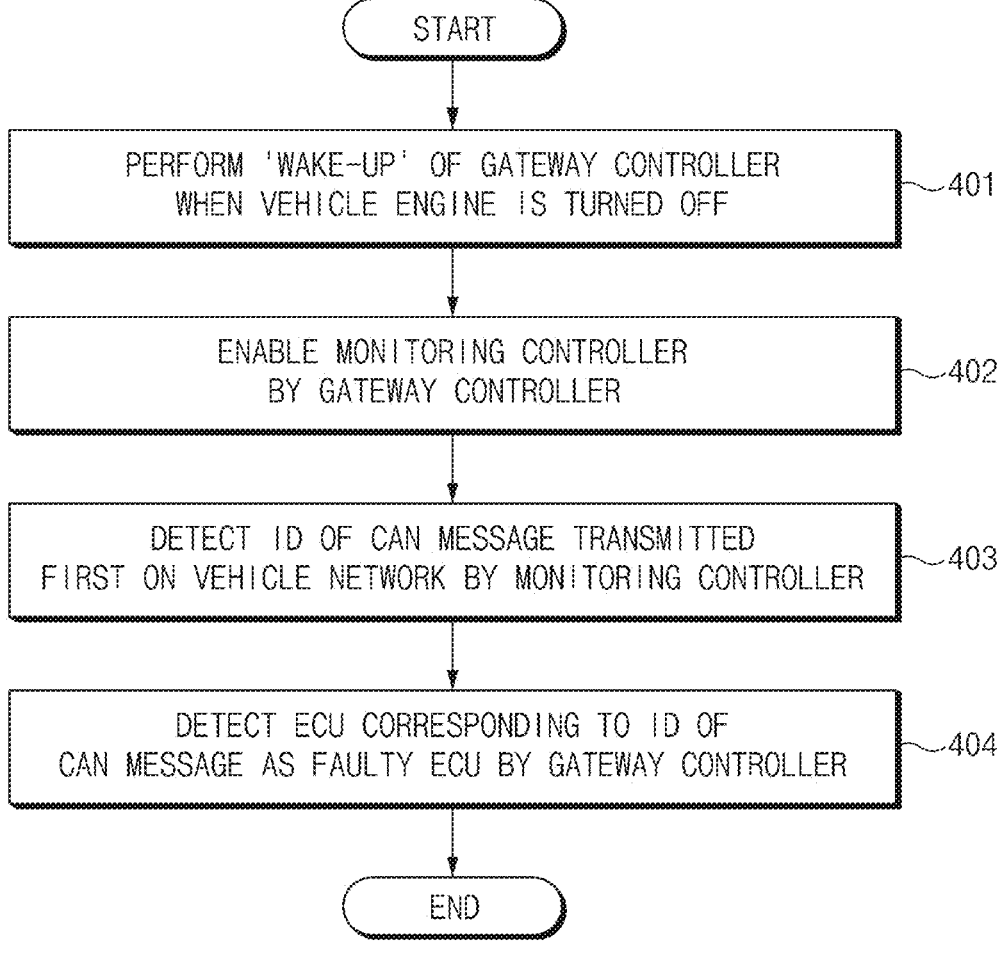
FIG. 4 is a flowchart describing a method for detecting a faulty ECU on a vehicle network according to an embodiment of the present disclosure.

FIG. 4 is a flowchart describing a method for detecting a faulty ECU on a vehicle network according to an embodiment of the present disclosure.

First, when the vehicle engine is turned off, the gateway controller 10 performs the 'wake-up' (401).

Thereafter, the gateway controller 10 enables the monitoring controller 20 (402).

Thereafter, the monitoring controller 20 detects the ID of the CAN message first transmitted on the vehicle network (403).

Afterwards, the gateway controller 10 detects the ECU corresponding to the ID of the CAN message as the faulty ECU of the plurality of ECUs on the vehicle network (404).

Figure 5:
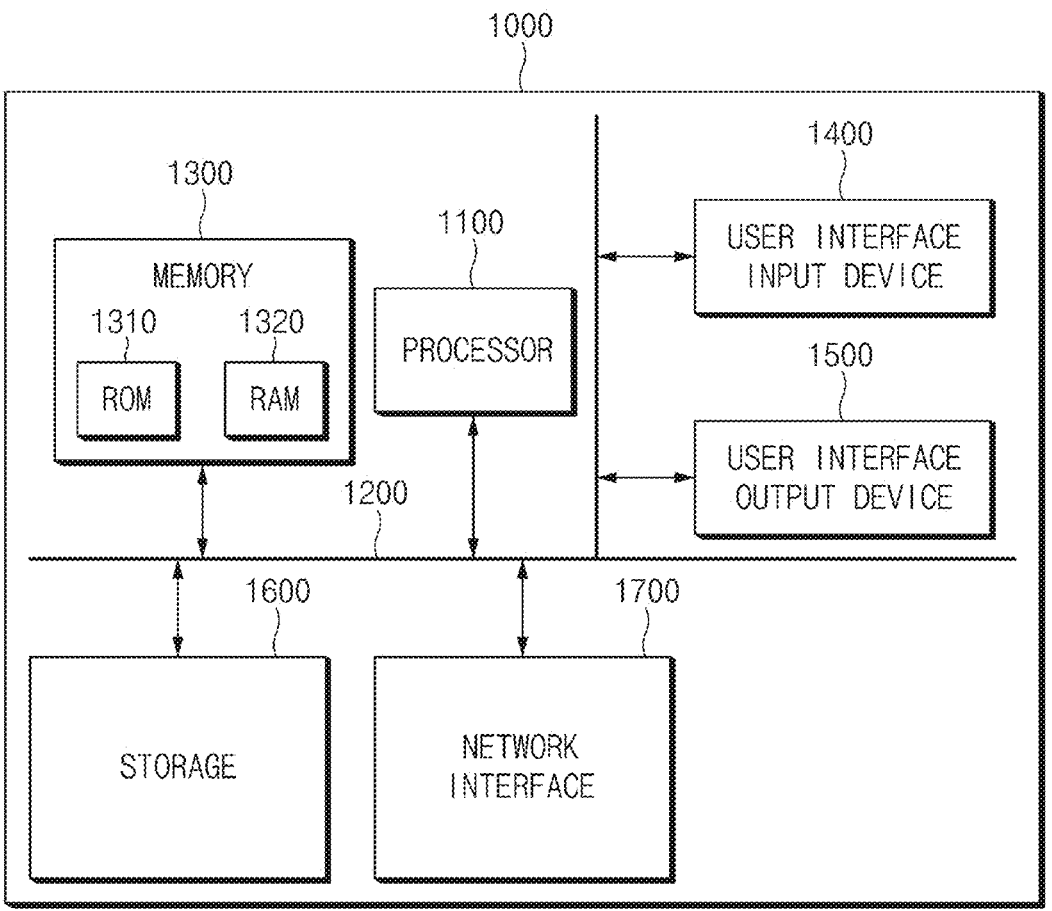
FIG. 5 is a block diagram illustrating a computing system for executing a method for detecting a faulty ECU on a vehicle network according to an embodiment of the present disclosure.

FIG. 5 is a block diagram illustrating a computing system for executing a method for detecting a faulty ECU on a vehicle network according to an embodiment of the present disclosure.

Referring to FIG. 5, a method for detecting a faulty ECU on a vehicle network according to each embodiment of the present disclosure described above may also be implemented through a computing system 1000. The computing system 1000 may include at least one processor 1100, a memory 1300, a user interface input device 1400, a user interface output device 1500, a storage 1600, and a network interface 1700, which are connected with each other through a system bus 1200.

The processor 1100 may be a central processing unit (CPU) or a semiconductor device that processes instructions stored in the memory 1300 and/or the storage 1600. Each of the memory 1300 and the storage 1600 may include various types of volatile or nonvolatile storage media. For example, the memory 1300 may include a read only memory (ROM) 1310 and a random access memory (RAM) 1320.

Accordingly, the operations of the method or algorithm described in connection with the embodiments disclosed in the specification may be directly implemented with a hardware module, a software module, or a combination of the hardware module and the software module, which is executed by the processor 1100. The software module may reside on a storage medium (i.e., the memory 1300 and/or the storage 1600) such as a random access memory (RAM), a flash memory, a read only memory (ROM), an erasable and programmable ROM (EPROM), an electrically EPROM (EEPROM), a register, a hard disk drive, a removable disc, or a compact disc-ROM (CD-ROM). The storage medium as an example may be coupled to the processor 1100. The processor 1100 may read out information from the storage medium and may write information into the storage medium. Alternatively, the storage medium may be integrated with the processor 1100. The processor (1100) and storage medium may be implemented with an application-specific integrated circuit (ASIC). The ASIC may be provided in a user terminal. Alternatively, the processor (1100) and storage medium may be implemented with separate components in the user terminal.

According to an embodiment of the present disclosure, an ECU that repeatedly causes a wake-up state in the vehicle may be quickly and accurately detected. This may be achieved by enabling a monitoring controller that is enabled by a gateway controller that performs a wake-up when a vehicle engine is turned off. The monitoring controller may detect an ID of a CAN message first transmitted on a vehicle network. The monitoring controller may transmit the ID of the CAN message to the gateway controller. The gateway controller may detect the ECU corresponding to the ID of the CAN message as the faulty ECU of a plurality of ECUs on the vehicle network.

The above description is merely illustrative of the technical idea of the present disclosure. Those having ordinary skill in the art to which the present disclosure pertains should be able to make various modifications and variations without departing from the essential characteristics of the present disclosure. Therefore, embodiments of the present disclosure are not intended to limit the technical spirit of the present disclosure. The embodiments are provided only for illustrative purposes. The scope of protection of the present disclosure should be construed by the attached claims, and all equivalents thereof should be construed as being included within the scope of the present disclosure.

What is claimed is:

1. A detection system for detecting a faulty electronic control unit (ECU) on a vehicle network, the detection system comprising:
    a monitoring controller configured to detect an identification (ID) of a controller area network (CAN) message first transmitted on a vehicle network; and
    a gateway controller configured to perform a wake-up when a vehicle engine is turned off, to enable the monitoring controller, and to detect an ECU corresponding to the ID of the CAN message as the faulty ECU of a plurality of ECUs on the vehicle network.

2. The detection system of claim 1, further comprising:
    a power controller configured to supply power to each ECU of the plurality of ECUs on the vehicle network,
    wherein the gateway controller is configured to block power supplied to the faulty ECU in conjunction with the power controller.

3. The detection system of claim 1, wherein the gateway controller is configured to accumulatively count a number of wake-ups, and enable the monitoring controller when the accumulated count number exceeds a preset number.

4. The detection system of claim 1, wherein the gateway controller is configured to enable the monitoring controller when an enable command is received.

5. The detection system of claim 1, wherein the gateway controller is configured to enable the monitoring controller when a State of Charge (SOC) of a battery obtained through the vehicle network is less than or equal to a threshold.

6. The detection system of claim 1, wherein the gateway controller is configured to perform the wake-up from a sleep state based on that any ECU of the plurality of ECUs on the vehicle network performs the wake-up.

7. The detection system of claim 1, wherein the monitoring controller is configured to continue to monitor the vehicle network even when the gateway controller is in a sleep state.

8. The detection system of claim 1, wherein the monitoring controller is configured to continue to monitor the vehicle network when a signal enabling the monitoring controller remains at a high level at a time when the gateway controller enters a sleep state.

9. The detection system of claim 1, wherein the monitor controller is configured to terminate monitoring the vehicle network when a signal enabling the monitoring controller changes to a low level at a time when the gateway controller enters a sleep state.

10. A method of detecting a faulty electronic control unit (ECU) on a vehicle network, the method comprising:
    performing a wake-up of a gateway controller when a vehicle engine is turned off;
    enabling, by the gateway controller, a monitoring controller;
    detecting, by the monitoring controller, an identification (ID) of a controller area network (CAN) message first transmitted on a vehicle network; and
    detecting an ECU corresponding to the ID of the CAN message as the faulty ECU of a plurality of ECUs on the vehicle network.

11. The method of claim 10, further comprising:
    blocking, by the gateway controller, power supplied to the faulty ECU.

12. The method of claim 10, wherein enabling the monitoring controller further comprises:
    counting, by the gateway controller, a number of wake-ups accumulatively; and
    enabling, by the gateway controller, the monitoring controller when the accumulated count number exceeds a preset number.

13. The method of claim 10, wherein enabling the monitoring controller further comprises:
    enabling, by the gateway controller, the monitoring controller when the gateway controller receives an enable command.

14. The method of claim 10, wherein enabling the monitoring controller further comprises:
    enabling, by the gateway controller, the monitoring controller when a State of Charge (SOC) of a battery obtained through the vehicle network is less than or equal to a threshold.

15. The method of claim 10, wherein performing the wake-up of the gateway controller further comprises:
    performing the wake-up from a sleep state of the gateway controller based on that any ECU of the plurality of ECUs on the vehicle network performs the wake-up.

16. The method of claim 10, wherein detecting the ID of the CAN message further comprises:
    continuing, by the monitoring controller, monitoring the vehicle network even when the gateway controller is in a sleep state.

17. The method of claim 10, wherein detecting the ID of the CAN message further comprises:
    continuing, by the monitoring controller, monitoring the vehicle network when a signal enabling the monitoring controller remains at a high level at a time when the gateway controller enters a sleep state.

18. The method of claim 10, wherein detecting the ID of the CAN message further comprises:
    terminating, by the monitoring controller, monitoring the vehicle network when a signal enabling the monitoring controller changes to a low level at a time when the gateway controller enters a sleep state.

* * * * *